United States Patent
Selkirk et al.

(10) Patent No.: US 6,904,508 B2
(45) Date of Patent: Jun. 7, 2005

(54) RECOVERY OF DYNAMIC MAPS AND DATA MANAGED THEREBY

(75) Inventors: Stephen S. Selkirk, Broomfield, CO (US); Charles A. Milligan, Golden, CO (US); Perry Merritt, Broomfield, CO (US); Edward T. Gladstone, Westminster, CO (US); Kenneth Willis, Castle Rock, CO (US)

(73) Assignee: Storage Technology Corporation, Louisville, CO (US)

( * ) Notice: Subject to any disclaimer, the term of this patent is extended or adjusted under 35 U.S.C. 154(b) by 886 days.

(21) Appl. No.: 09/752,253

(22) Filed: Dec. 30, 2000

(65) Prior Publication Data

US 2002/0087673 A1 Jul. 4, 2002

Related U.S. Application Data

(60) Provisional application No. 60/212,284, filed on Jun. 19, 2000.

(51) Int. Cl.[7] .............................................. G06F 12/00
(52) U.S. Cl. .......................................... 711/206; 714/5
(58) Field of Search ................................ 711/202, 203, 711/206, 207, 208, 160, 161, 162; 714/2, 5, 6; 370/238

(56) References Cited

U.S. PATENT DOCUMENTS

| 5,008,786 | A | * | 4/1991 | Thatte .......................... 711/162 |
| 6,038,639 | A | * | 3/2000 | O'Brien et al. .............. 711/114 |
| 6,105,115 | A | * | 8/2000 | Mathews et al. ........... 711/160 |
| 6,529,995 | B1 | * | 3/2003 | Shepherd ..................... 711/114 |
| 6,549,519 | B1 | * | 4/2003 | Michels et al. .............. 370/238 |

* cited by examiner

*Primary Examiner*—Kevin Verbrugge
(74) *Attorney, Agent, or Firm*—Yee & Associates, P.C.

(57) ABSTRACT

A mechanism is provided for storing self-defining data and mapping elements with either a fixed set of allowed structures or types or with the structures and types determined by rules. Recovery is enhanced by the use of backward and forward pointers between data and mapping elements for the data elements in the order written by the management algorithm. Recovery is also enhanced by the use of companion pointers with metadata. The companion pointers may include pointers to data or mapping elements that are part of the same structural grouping. The metadata may describe the structural grouping. The metadata may also include pointers to the previous and/or next versions of the same elements. Recovery of the data and/or mapping structures is achieved by the reverse application of the management algorithm.

20 Claims, 5 Drawing Sheets

RECOVERY OF DYNAMIC MAPS AND DATA MANAGED THEREBY

CROSS REFERENCE TO PROVISIONAL AND RELATED APPLICATIONS

This application claims the benefit of the filing date of corresponding U.S. Provisional Patent Application Ser. No. 60/212,284, entitled "System for providing a policy-based demand and use of functions like virtual volumes, instant copy, RAID, etc.", filed Jun. 19, 2000. In addition, the present invention is related to applications entitled A SYSTEM TO SUPPORT DYNAMICALLY FLEXIBLE DATA DEFINITIONS AND STORAGE REQUIREMENTS, Ser. No. 09/751,635, EFFECTING INSTANT COPIES IN A DYNAMICALLY MAPPED SYSTEM, Ser. No. 09/884,294, USING CURRENT RECOVERY MECHANISMS TO IMPLEMENT DYNAMIC MAPPING OPERATIONS, Ser. No. 09/800,714, DYNAMICALLY CHANGEABLE VIRTUAL MAPPING SCHEME, Ser. No. 09/751,772, FLOATING VIRTUALIZATION LAYERS, Ser. No. 09/752,071, and SELF-DEFINING DATA UNITS, Ser. No. 09/751,641, which are filed even date hereof, assigned to the same assignee, and incorporated herein by reference.

BACKGROUND OF THE INVENTION

1. Technical Field

The present invention relates to an improved data processing system and, in particular, to recovery of virtualization structures. Still more particularly, the present invention provides a method and apparatus for recovery of virtualization mapping structures utilizing multiple techniques simultaneously and in parallel.

2. Description of Related Art

Maps are used in a disk controller to convert a host based Logical Unit (LUN) and Logical Block Address (LBA) to a controller based LUN and LBA. A mapping system is necessary for a disk controller to provide features such as virtual volumes, data compression, and snapshot. In fact, maps are used in current controller designs to facilitate the use of Redundant Array of Independent Disk (RAID) devices.

A problem that arises when using a mapped based architecture is where to store the maps. Current map designs use anywhere from four megabytes for a very simple map to dynamic mapping systems that use twelve megabytes or more. As the sizes of disks increase and the sizes of system configurations increase, it is not inconceivable that these systems will require maps that are several gigabytes in size.

These large structures make recovery of the data, in the case of a lost or failed virtual map, a time-consuming and complicated process. In addition, some simple and straightforward mapping schemes are vulnerable to loss of data even if only a small portion of the map is corrupted or lost. In some cases, the recovery takes so long that the customer may consider the data lost even if it can eventually be recovered.

Thus, it would be advantageous to provide a method and apparatus for recovery of dynamic maps and data managed thereby.

SUMMARY OF THE INVENTION

The present invention provides a mechanism for storing self-defining data and mapping elements with either a fixed set of allowed structures or types or with the structures and types determined by rules. Recovery is enhanced by the use of backward and forward pointers between data and mapping elements for the data elements in the order written by the management algorithm. Recovery is also enhanced by the use of companion pointers with metadata. The companion pointers may include pointers to data or mapping elements that are part of the same structural grouping. For example these pointers may point to the elements that make up a redundancy stripe or the elements that make up a mapping sub-tree. The metadata may describe the structural grouping. The metadata may also include pointers to the previous and/or next versions of the same elements. For example, the metadata may include a pointer to the previous older version of a data block or to the location where the next version of the data block will be stored.

Recovery of data or mapping structures is achieved by reverse application of the management algorithm. For example, if using a log structured file algorithm for storing the elements, then the whole structure may he recovered by reading the log backwards. Recovery is enhanced by the use of multi-processing and by the use of a binary fracturing algorithm. For example, forward and backward pointers may be used and different processors may be assigned to begin recovery at different partitions of the structure, each recovering a part of the whole.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
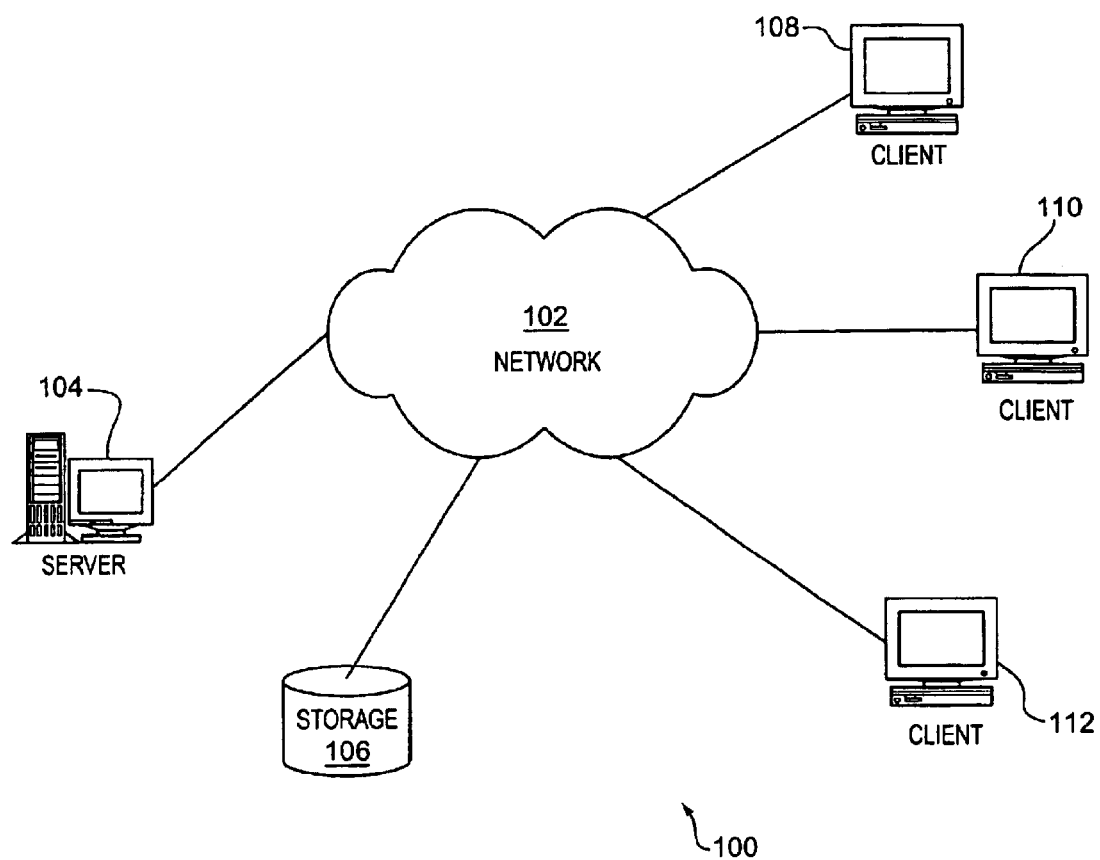
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage subsystem 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Distributed data processing system 100 may be implemented as one or more of a number of different types of networks, such as, for example, an intranet, a local area network (LAN), or a wide area network (WAN). Network 102 contains various links, such as, for example, fiber optic links, packet switched communication links, enterprise systems connection (ESCON) fibers, small computer system interface (SCSI) cable, wireless communication links. In these examples, storage subsystem 106 may be connected to server 104 using ESCON fibers. FIG. 1 is intended as an example and not as an architectural limitation for the present invention.

Figure 2:
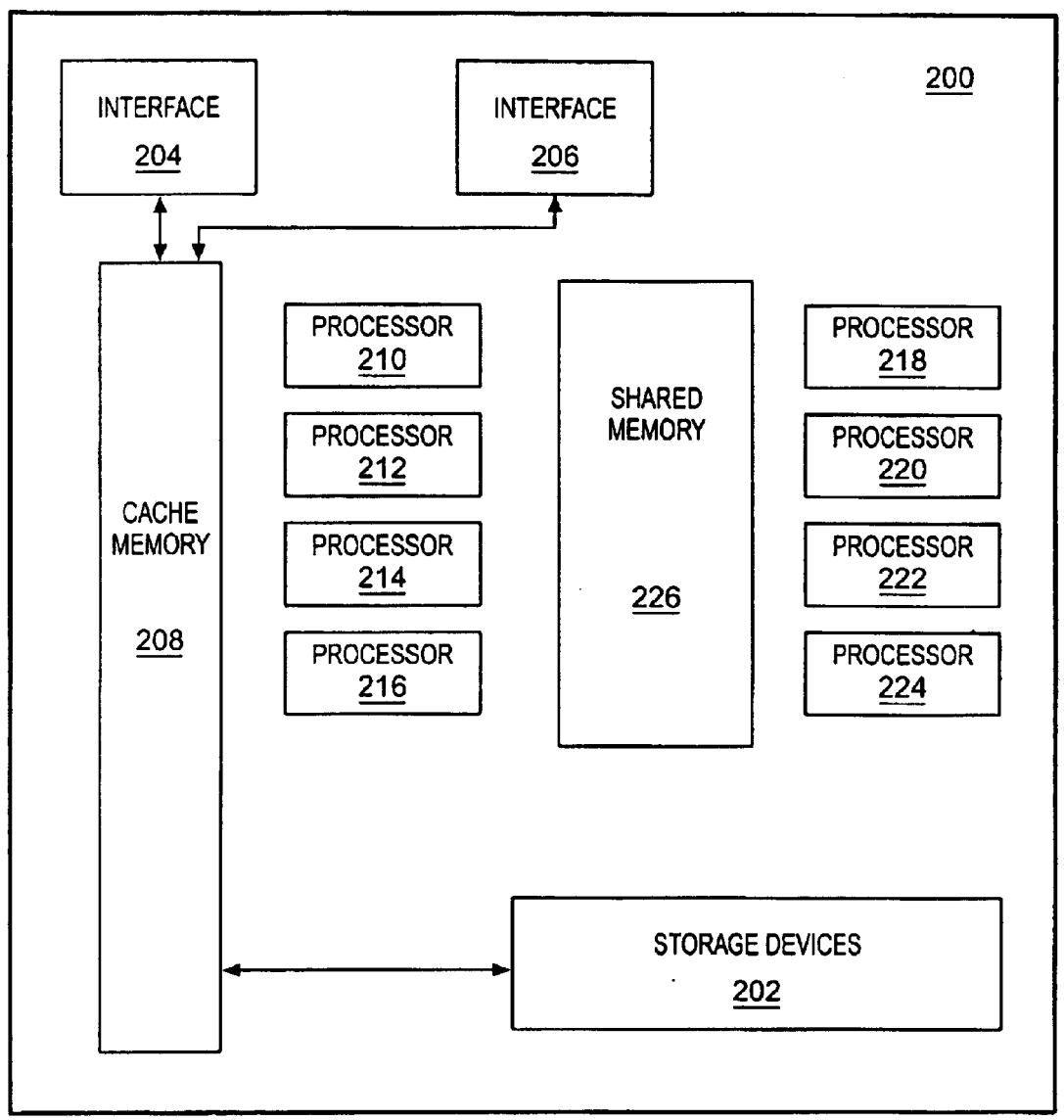
FIG. 2 is a block diagram of a storage subsystem in accordance with a preferred embodiment of the present invention.

Turning next to FIG. 2, a block diagram of a storage subsystem is depicted in accordance with a preferred embodiment of the present invention. Storage subsystem 200 may be used to implement storage subsystem 106 in FIG. 1. As illustrated in FIG. 2, storage subsystem 200 includes storage devices 202, interface 204, interface 206, cache memory 208, processors 210–224, and shared memory 226.

Interfaces 204 and 206 in storage subsystem 200 provide a communication gateway through which communication between a data processing system and storage subsystem 200 may occur. In this example, interfaces 204 and 206 may be implemented using a number of different mechanisms, such as ESCON cards, SCSI cards, fiber channel interfaces, modems, network interfaces, or a network hub. Although the depicted example illustrates the use of two interface units, any number of interface cards may be used depending on the implementation.

In this example, storage subsystem 200 is a shared virtual array. Storage subsystem 200 is a virtual storage system in that each physical storage device in storage subsystem 200 may be represented to a data processing system, such as client 104 in FIG. 1, as a number of virtual devices. In this example, storage devices 202 are a set of disk drives set up as a redundant array of independent disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and track the reading and writing of data to storage devices 202. In particular, processors 210–224 are used to execute instructions for routines used in snapshot copy operations.

The present invention manages virtual storage facilities comprising an organization of computer equipment, for example, a host network, data transfer means, storage controller means and permanent storage means and attachment means connecting these devices together. The data storage facilities also may include management information associated with data units such that the management information provides an inventory of capabilities with upper and lower boundaries that may limit the options available to store the data and still meets a user's criteria. For purposes of this application, a data unit is a logical entity known to a owning entity that is composed of a number of data elements and meta-data and a data element is a grouping of data bits or bytes that the subsystem chooses to manage as a consistent set. Such management information may be independent of attributes of characteristics of the elements of the physical storage subsystem actually used to store the data objects, but may consist of imputed associations with those attributes through, for example, changeable rule sets, processes or algorithms. These rule sets, processes or algorithms may be changed by user demand or via processes that may monitor data object usage and manipulation. The storage of data objects may be adjusted to comply with modifications in the, for example, rules sets, processes or algorithms.

Figure 3:
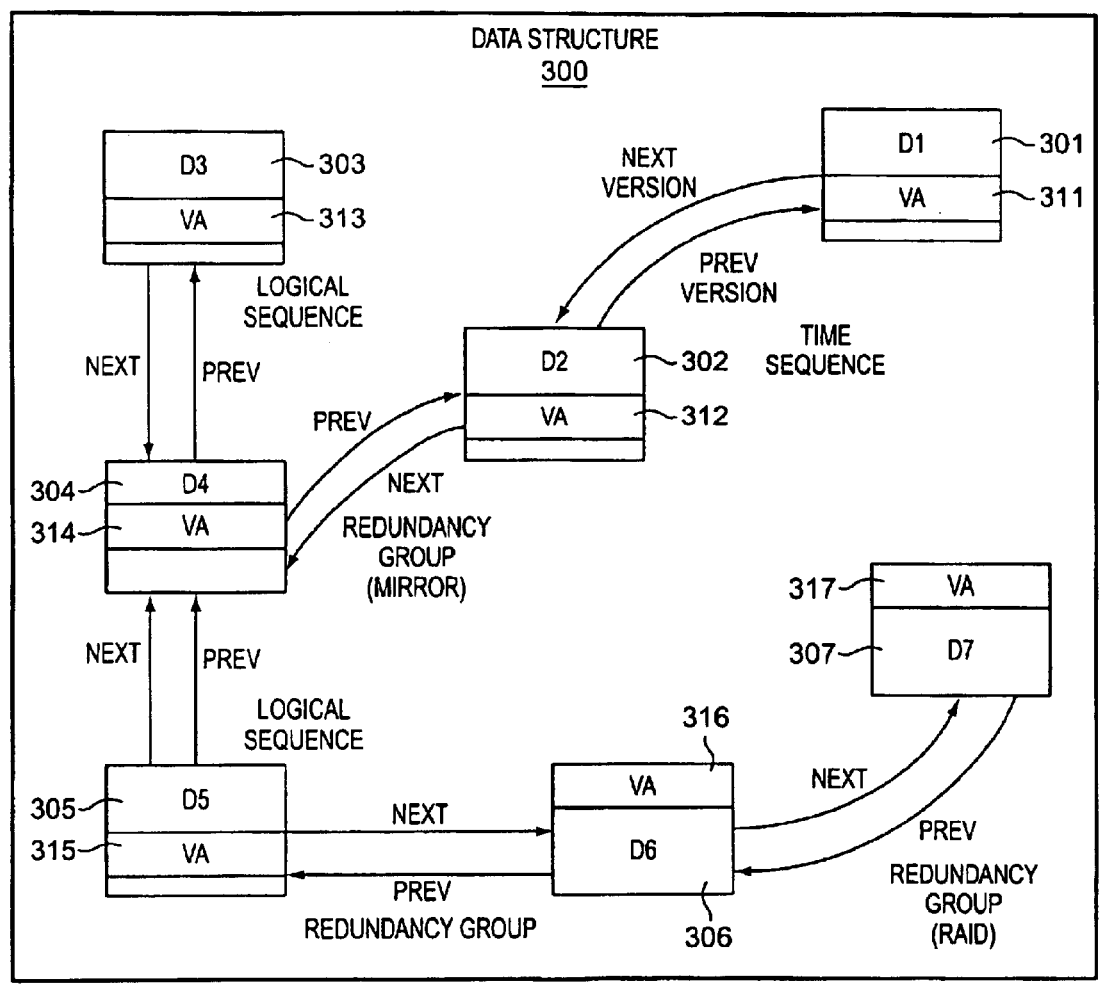
FIG. 3 is a block diagram of a data structure in accordance with a preferred embodiment of the present invention.

With reference to FIG. 3, a block diagram of a data structure is illustrated in accordance with a preferred embodiment of the present invention. Data structure 300 includes data elements D1 301, D2 302, D3 303, D4 304, D5 305, D6 306, and D7 307. Each data element includes metadata uniquely associated with the data such that installation management criteria, boundaries, and preferences for each data unit and attributes for the data units are maintained. This metadata may include time sequencing of metadata (time stamp), location of stored data, structure definition pointers including size parameters, pointers to related metadata units, management rules, sequencing rules, and management functions invoked to accomplish management rules.

The management rules may include performance criteria, reliability criteria, availability criteria, and capacity criteria. The sequencing rules may include logical rules, time rules, and structure rules. Management functions may include RAID, parity, multiple parity, and other known functions that may be invoked to accomplish management rules. Management rules, sequencing rules, and management functions may be stored in the metadata as pointers to the rules or functions.

Furthermore, each data element may include pointers to the next or previous version in a time sequence. For example, data element D1 301 includes a pointer to the next version of updated data, D2 302. Consequently, data element D2 302 includes a pointer to the previous version, D1 301. Each data element may include pointers to the next or previous data element in a logical sequence, such as a next track in a sequence. For example, data element D3 303 may include a pointer to D4 304 as the next track and D4 304 may include a pointer to D5 305 as the next track. Conversely, D5 305 may include a pointer to D4 304 as the previous data element in the logical sequence and D4 304 may include a pointer to D3 303 as the previous data element.

Data elements D2 302 and D4 304 may include metadata to indicate that they are mirrored with pointers to the mirrored copies. Therefore, one can get twice the read performance and improved availability. Data elements D5 305, D6 306, and D7 307 may include metadata to indicate that they are part of a RAID stripe and the available read bandwidth is three drives.

The metadata may be stored separate from the data. Thus, each data element may include a virtual address (VA) pointing to the host view of the stored data. For example, D1 301 includes VA 311, D2 302 includes VA 312, D3 303 includes VA 313, D4 304 includes VA 314, D5 305 includes VA 315, D6 306 includes VA 316, and D7 307 includes VA 317.

The data elements in FIG. 3 may be mapping elements. Mapping elements may include forward and backward pointers to mapping elements. If the mapping tables are lost or corrupted, then the mapping may be recovered by finding one or more of the data elements, rebuilding the mapping by following the all the links to the other data elements, and reestablishing the mapping entries with the virtual address stored in the data element.

Figure 4:
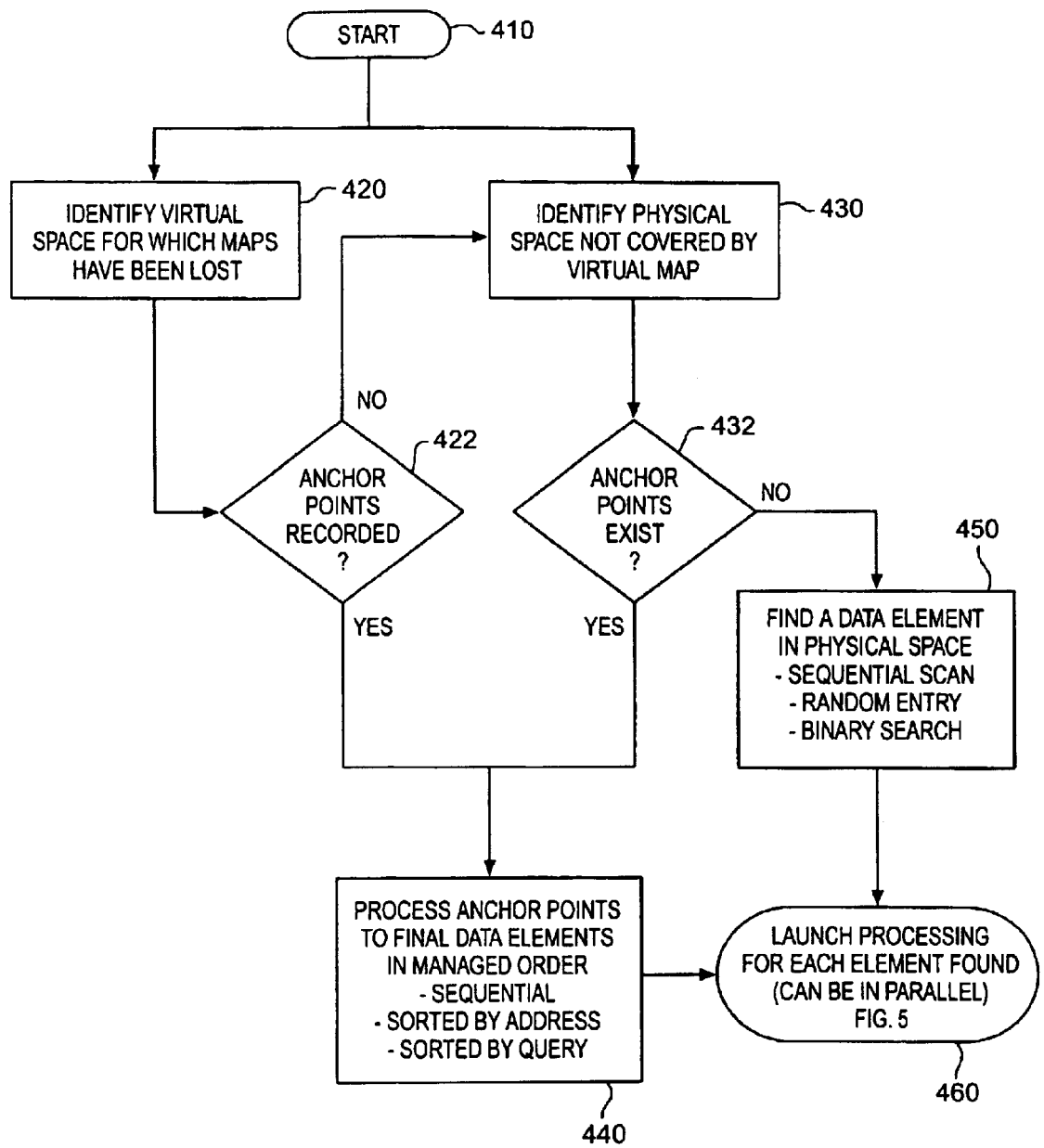
FIG. 4 illustrates the logic floc for finding a data element to be processed in accordance with a preferred embodiment of the present invention.

FIG. 4 illustrates the logic flow for finding a data element to be processed in accordance with a preferred embodiment of the present invention. In this example, the operation begins by either identifying a virtual space for which mapping has been lost (step 420) or identifying a physical space not covered by a virtual map (step 430). If an anchor point is recorded (step 422:YES), then the anchor points are processed to the find data elements in a managed order which includes such techniques as, for example: sequential addresses, sorted by address, sorted by query frequency (step 440). To enhance recovery for specific virtual LUNs or searching through virtual LUNs, a set of pointers stored, for example in a linked list, is maintained of logical sequence pointers for the data elements used to store the data units of the virtual LUNS. Pointers are kept in safe storage to at least one data element or an associated metadata unit in the linked list. This may be called an anchor point. Then when recovery is needed or enhanced searching is requested, and a request from a server is received for a data unit in that LUN, the recovery or searching may use the pointer in safe storage to locate one element and follow the sequence of pointers to the requested element. Additional anchor points may be stored to improved recovery or searching speed. The order of processing the discovered anchor points may be optimized for the desired recovery, for example, if seeking a specific data unit, the anchor points are sorted by their address, closer to the requested data unit first.

Figure 5:
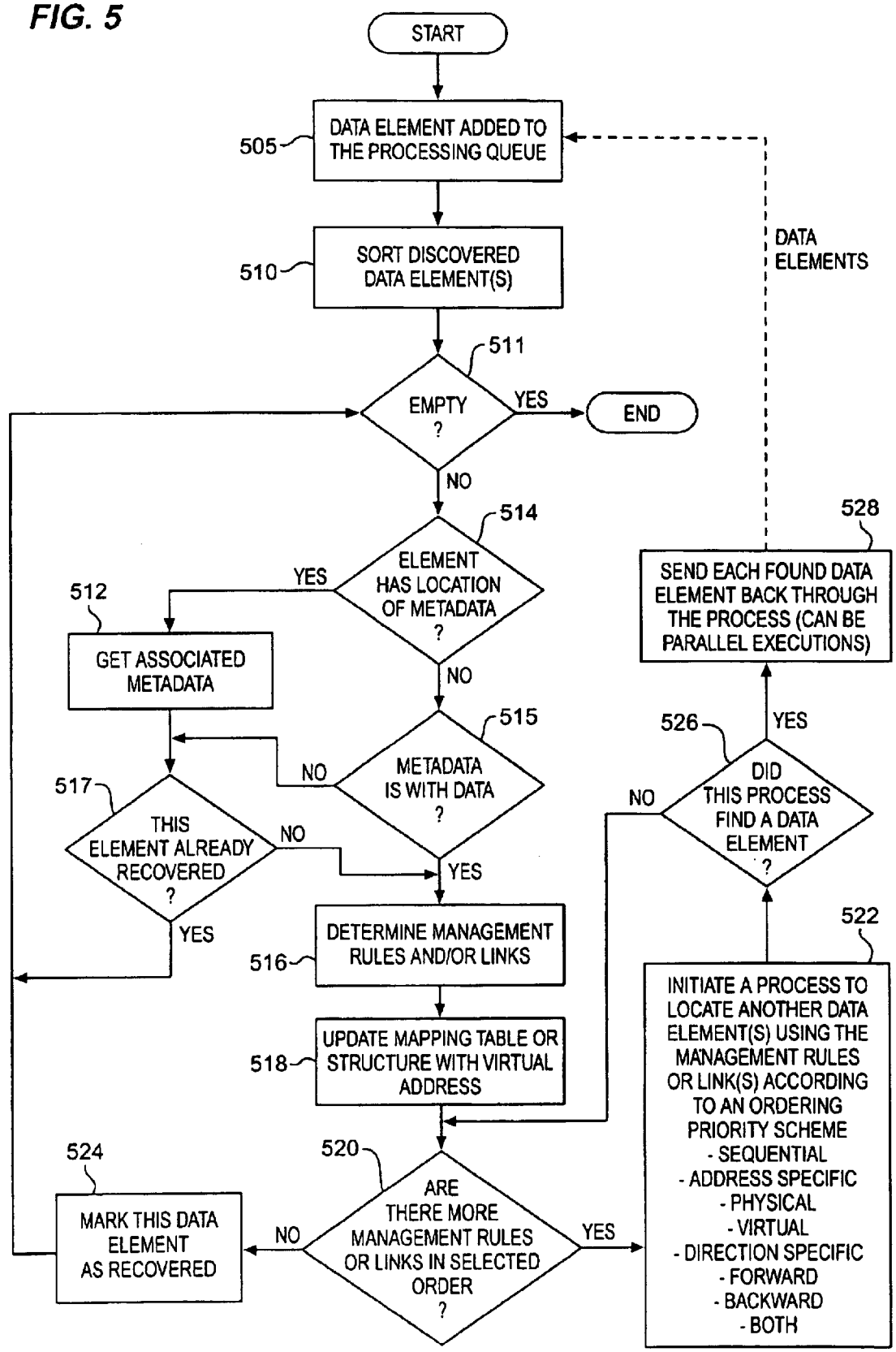
FIG. 5 illustrates the logic flow for processing the meta data of a data element in order to rebuild a virtual mapping table in accordance with a preferred embodiment of the present invention.

Then processing is launched for each data element found (step 460) as further explained in FIG. 5.

Returning to step 430 in which a physical space is identified which is not covered by a virtual map, a determination is then made as to whether or not an anchor point exists (step 432). If an anchor point does exist (step 432:YES), then the anchor point is processed to final data elements in a managed order which is sequential and sorted by address an/or sorted by query (step 440). If an anchor point does not exist (step 432:NO), then a data element is found in a physical space. This may be accomplished by a sequential scan or by selecting a random entry or by a binary search (step 450) and then processing is launched for each data element found (step 460) which is further explained in FIG. 5.

FIG. 5 illustrates the logic flow for processing the meta data of a data element in order to rebuild a virtual mapping table in accordance with a preferred embodiment of the present invention. Expanding on FIG. 4, in this example, the operation begins with a data element being added to the processing queue (step 505). The discovered data element(s) is/are sorted (step 510). Then a determination is made as to whether or not the processing queue is empty (step 511). If the processing queue is empty (step 511:YES), the operation terminates. If the processing queue is not empty (step 511:NO) then a determination is made as to whether or not the data element has the location of meta data (step 514). If the data element has the location of the meta data (step 514:YES), the associated meta data is retrieved. Then a determination is made as to whether or not the data element is already recovered (step 517). If the data element is already recovered (step 517:YES), then the operation returns to step 511 in which a determination is made as to whether or not the processing queue is empty. Returning to step 517, if the data element is not already recovered (step 517:NO), then the management rules and/or links are determined (step 516).

Returning to step 514, if the data element does not have the location of the meta data (step 514:NO), then a determination is made as to whether or not the meta data is with the data (step 515). If the meta data is not with the data (step 515:NO), then the determination is made as to whether or not the data element is already covered (step 517). If the meta data is with the data (step 515:YES), then the management rules and/or links are determined (step 516). A mapping table or structure with a virtual address is updated (step 518). Then a determination is made as to whether or not there are more management rules and/or links in selected order (step 520). If there are not anymore management rules and/or links in selected order (step 520:NO), then the data element is marked as recovered (step 524). The operation then returns to the step in which a determination is made as to whether or not the processing queue is empty (step 511).

If there are more management rules and/or links in selected order (step 520:YES), then a process is initiated to located another data element or elements using the management rules and/or links according to an ordering priority scheme, which may be, for example, sequential, physical address specific, virtual address specific, forward direction specific, backward direction specific or direction specific in both a forward and backward direction (step 522). If the meta data or data elements are stored in a sequential table, a process is initiated to locate additional elements by incrementing to the next table entry and initiating a process to locate additional elements by decrementing to the previous table entry. If there are pointers to a previous or next element in a logical sequence, a process is initiated to locate additional elements by following the "next" pointer and initiating a process to locate additional elements using the previous pointer. If there are companion pointers to elements associated in a redundancy group, a process is initiated to locate additional elements using the companion pointer(s). If there is a request from a host server to access a particular addressed data unit, while recovery is needed or in progress, the recovery may be optimized (directed) for recovery of the requested data unit. For example, if the currently dedicated data element in the recovery process has previous and "next" in logical sequence pointers, the pointer may be selected which points to the requested data element and initiate a process to locate additional elements using that pointer. If the currently located data elements are in a sequential table structure and the requested data element also fits within the table structure, a binary search algorithm may be used on the table structure to locate the requested data element.

If a primary management rule for the location of data elements is a log structured file (LSF) system and the portion of the map is maximized per unit time, then the LSF may be processed in a reverse manner. In this case, the anchor point may have a pointer to the last LSF log entry and each log entry may contain pointers to the previous log entry and to the meta data and/or data elements updated with that log entry.

The map recovery may then proceed by processing all the data elements associated with the last LSF log entry. Then locating the previous log entry and processing all the data elements associated with the log entry and following this process for each previous log entry. Since the probability of valid mapping to data elements may decrease with the age of the log entry, this should maximize the recovery of the valid map entries.

A determination is made as to whether the process in step 522 is able to find a data element (step 526). If a data element is not found (step 526:NO), then the operation returns to step 520 to determine whether there are more management rules or links in selected order. If the process did find a data element (step 526:YES), then the process sends each found data element back through the process (can be parallel execution) (step 528) and returns to step 520 to determine whether there are more management rules or links in selected order.

An example of applying the process described in FIGS. 4 and 5 to the virtual map structure as described in FIG. 3, assume that D4 304 in FIG. 3 is a found data structure. Also, assuming a full recovery (i.e., not a recovery at a specific requested data element), the process determines that the data element mapping has not been recovered. The process determines that there two management rules associated with D4 304 in FIG. 3; one is a logical sequence and the other is a mirrored redundancy group. The mapping table is updated with the virtual address (VA) 314 for D4 304. A process (P1) is initiated to locate the next data element using the "next" logical sequence pointer. A process (P2) is initiated to locate the previous element using the "prev" logical sequence pointer. A process (P3) is initiated to locate the companion in the mirror using the "prev" redundancy group pointer. D4 304 is marked as having been recovered which may be indicated in the mapping structure. Process P1 locates element D5 305. Process P1 determines that element D5 305 has not been recovered. Process P1 determines that element D5 305 has two associated management rules. One is a logical sequence and the other is a redundancy group (RAID). The mapping table is updated with the virtual address (VA) 315 for data element D5 305. A process (P4) is initiated to locate the next element in logical sequence. A process (P5) is initiated to locate the previous element in logical sequence. A process (P6) is initiated to locate the companion element in the redundancy group using the "next" redundancy group pointer. D5 305 is marked as having been recovered. Process P6 locates element D4 304 and determines that element D4 304 has already been recovered and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for recovery of compromised instances of virtual mapping systems, comprising the steps of:
   identifying a plurality of physical data elements for which a mapping table has been compromised;
   determining whether anchor points exist for the plurality of physical data elements;
   processing anchor points to find the data elements in managed order if anchor points exist; and
   launching processing for each data element found to recover the compromised mapping table.

2. The method of claim 1, wherein the anchor points are logical pointers, each logical pointer pointing to a data element used to store a data unit and metadata associated with the data unit, the metadata specifying at least one management rule associated with the data unit.

3. The method of claim 1, wherein the managed order comprises data elements that are sorted by their physical address.

4. The method of claim 1, wherein the managed order comprises data clements that are sorted by query frequency.

5. The method of claim 1, further comprising:
   finding data elements in physical space if anchor points do not exist.

6. The method of claim 5, wherein the step of finding data elements in physical space comprises at least one of a sequential scan, random entry, and a binary search.

7. The method of claim 1, wherein the step of launching processing far each data element found comprises launching processing of a first element and a second element in parallel.

8. The method of claim 1, wherein the step of launching processing for each data element found comprises processing at least one forward pointer from a found anchor point and processing in parallel at least one backward pointer from an alternate anchor point.

9. The method of claim 1, wherein at least some of the data elements include a first pointer to a previous version of the data clement and a second pointer to a next version of the data element.

10. The method of claim 1, wherein at least some of the data elements include a first pointer to a next data element of a logical sequence.

11. The method of claim 10, wherein the logical sequence is a track logical sequence, and wherein the next data element is a next track in the track logical sequence.

12. The method of claim 1, wherein at least one of the data elements has associated metadata that indicates at least two management rules associated with the at least one data element.

13. The method of claim 12, wherein the at least two management rules are a logical sequence and a mirrored redundancy group.

14. An apparatus for recovery of compromised instances of virtual mapping systems, comprising:
   identification means for identifying a plurality of physical data elements for which a mapping table has been compromised;
   determination means for determining whether anchor points exist for the plurality of physical data elements;
   first processing means for processing anchor points to find the data elements in managed order if anchor points exist; and
   second processing means for processing each data element found to recover the compromised mapping table.

15. The apparatus of claim 14, wherein the anchor points are logical pointers, each logical pointer pointing to a data, element used to store a data unit and metadata associated with the data unit, the metadata specifying at least one management rule associated with the data unit.

16. The apparatus of claim 14, wherein the managed order comprises data elements that are sorted by their physical address.

17. The apparatus of claim 14, wherein the managed order comprises data elements that are soiled by query frequency.

18. The apparatus of claim 14, further comprising:
means for finding data elements in physical space if anchor points do not exist.

19. A The apparatus of claim 18, wherein the means for finding data elements in physical space comprises at least one of a sequential scan, random entry, and a binary search.

20. A method of recovering a virtual mapping of data elements comprising steps of:
responsive to a determination that the virtual mapping is compromised, traversing the data elements to find links to other of the data elements; and
reestablishing mapping entries with virtual addresses stored in the data elements.

* * * * *